United States Patent [19]
Hamstra et al.

[11] Patent Number: 5,749,542
[45] Date of Patent: May 12, 1998

[54] TRANSITION SHOULDER SYSTEM AND METHOD FOR DIVERTING BOUNDARY LAYER AIR

[75] Inventors: Jeffrey William Hamstra, Fort Worth; Brent Neal McCallum, Benbrook; Thomas Gerard Sylvester; Brett William Denner, both of Fort Worth; Jeffrey Allen Moorehouse, Arlington, all of Tex.

[73] Assignee: Lockheed Martin Corporation, Fort Worth, Tex.

[21] Appl. No.: 654,295

[22] Filed: May 28, 1996

[51] Int. Cl.$^6$ ............................................. B64D 33/02
[52] U.S. Cl. .......................................... 244/53 B; 137/15.1
[58] Field of Search .......................... 244/53 R, 53 B, 244/74, 204; 137/15.1, 15.2

[56] References Cited

U.S. PATENT DOCUMENTS

| | | | |
|---|---|---|---|
| 3,066,892 | 12/1962 | Smith et al. | 244/53 B |
| 3,137,460 | 6/1964 | Owl, Jr. et al. | 244/53 B |
| 3,667,704 | 6/1972 | Assmann | 137/15.1 |
| 4,502,651 | 3/1985 | Jungclaus et al. | 244/53 B |
| 4,655,413 | 4/1987 | Genssler et al. | 137/15.1 |

*Primary Examiner*—Galen L. Barefoot
*Attorney, Agent, or Firm*—Baker & Botts, L.L.P.

[57] ABSTRACT

A diverterless engine inlet system that integrates a transition shoulder into a system for diverting air from the inlet of an aircraft engine. ????? The bump includes an isentropic compression surface raised outwardly from the body of the aircraft to form a portion of the inner surface of the inlet. The transition surface works with the compression surface to divert low energy boundary layer air from the inlet during aircraft operation.

28 Claims, 10 Drawing Sheets

TRANSITION SHOULDER SYSTEM AND METHOD FOR DIVERTING BOUNDARY LAYER AIR

TECHNICAL FIELD OF THE INVENTION

The present invention relates in general to engine inlet systems, and more particularly, to a transition shoulder system and method for diverting boundary layer air from the inlet of an engine.

BACKGROUND OF THE INVENTION

Many of today's fighter aircraft must cruise supersonic while maintaining low radar cross-sections to avoid detection on radar. The engine inlets on the aircraft must also work well supersonically while having a low radar cross-section.

During high speed flight, a very low velocity, low pressure boundary layer of air builds up on the fuselage of a supersonic aircraft. Because this low energy air can cause poor engine performance, high speed aircraft have traditionally employed some type of boundary layer diverter system to prevent the boundary layer air from entering the inlet. Current advanced supersonic tactical aircraft utilize air induction systems that include boundary layer diverters, boundary layer bleed systems, and overboard bypass systems to divert this boundary layer air in order to provide higher engine inlet performance.

A boundary layer diverter is essentially a gap between the side of the aircraft body and the inlet that diverts the low-pressure boundary layer air that builds up on the fuselage and prevents this boundary layer air from entering the engine. In addition to the diverter, traditional inlet systems also utilize a boundary layer bleed system on the edge of the inlet. The bleed system works in a manner similar to the diverter, except instead of skimming off the boundary layer air, the bleed system takes that air on-board, then vents it up through the airplane and exhausts it through a bleed exit on the aircraft. In addition to a diverter and a bleed system, some traditional inlet systems also use an overboard bypass system. The bypass system exists to correct a high speed problem with the aerodynamics of traditional inlet systems. The inlet has to flow a certain amount of air to work properly. At high speeds, the engine airflow demand cuts back to a level below that required for the inlet to work properly. The bypass system compensates by dumping the excess air overboard.

Present air induction systems require these subsystems in order to make this low observable inlet design work properly at high speeds. These systems are highly complex and involve a variety of composite materials. These air induction systems increase the weight, the cost of production, mechanical complexity and the cost of maintenance of the aircraft.

The "bump" concept of having a raised compression surface has been discussed in industry references, most recently in a book entitled "Intake Aerodynamics," edited by J. Seddon and E. L. Goldsmith, and published in 1985 by the American Institute of Aeronautics and Astronautics. Performance of an inlet with a compression surface was measured and documented in the 1956 report "Performance of External-Compression Bump Inlet at Mach Numbers of 1.5 to 2.0," by Simon, Brown, and Huff (NACA RM E56119). However, the concept reported therein, unlike the present invention, utilized an unswept cowl and bump surface boundary layer bleed Bump inlet technology was also examined in the Air Force Wright Laboratory program "Management of Advanced Inlet Boundary Layers" (Contract F33615-89-C-3000). This program examined a bump inlet concept with a bleed system and a serrated cowl designed to optimize, rather than eliminate, boundary layer diverters and bleed systems.

SUMMARY OF THE INVENTION

In accordance with the present invention, a system and method for diverting boundary layer air from an aircraft engine is provided that substantially eliminates or reduces disadvantages and problems associated with previously developed engine inlet systems.

The present invention provides a diverterless inlet system that uniquely integrates a "bump" including an isentropic compression surface with a forward swept, aft-closing cowl. The bump is a surface raised outwardly from the body of the aircraft. The cowl couples to the body of the aircraft and forms the outer surfaces of the inlet. The cowl closes against the body of the aircraft at the aft-most points of the inlet opening. The bump and the cowl work together to divert boundary layer air and prevent substantially all of the lower energy boundary layer air from flowing through the inlet during aircraft operation.

A technical advantage of the present invention is that the forward-swept, aft-closing cowl and the isentropic compression surface reduce the complexity of the aircraft's inlet system. In particular, the present invention does not require a boundary layer diverter, a side or splitter plate, a boundary layer bleed system, or an overboard bypass system. Furthermore, the present invention has no moving parts. This reduction in complexity reduces the tactical fighter aircraft's empty weight, production cost, and maintenance support requirements. These savings are estimated to be 250 pounds per aircraft, $225,000 per aircraft, and 0.03 maintenance man hours per flight hour, respectively.

The present invention provides another technical advantage in that it is adaptable to virtually any supersonic aircraft.

Because all inlet designs spill air from the inlet area, another technical advantage of the present invention is that it takes advantage of the fact that some air must be spilled outboard by spilling the lower quality boundary layer air, rather than the higher quality free stream air.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

The present invention provides a supersonic engine inlet concept for use in, for example, tactical aircraft applications, that utilizes a "bump" comprising a fixed three-dimensional, isentropic compression surface, a transition shoulder, and a diffuser fairing, combined with an aft-closing, forward-swept cowl which closes against the aircraft at the aft-most points of the inlet opening. The present invention eliminates the need for boundary layer diverters, overboard bypass systems, and boundary layer bleed systems currently used on conventional air induction systems for supersonic aircraft. Thus, the present invention reduces aircraft weight, cost, and complexity. These features are eliminated because the compression surface and cowl work synergistically to provide boundary layer diversion capability.

The compression surface portion of the bump, can be designed to produce a conical flow field that can be equivalent to that of an axisymmetric body with a 12° semivertex angle isentropically blended to a 21° final turning angle. The span-wise static pressure on the surface can begin to divert boundary layer air outboard. The pressure differential between the inlet and the area surrounding the inlet further diverts the boundary layer air outboard. The compression surface can also serve to reduce terminal shock Mach number, thus reducing the tendency for shock-induced flow separation. Because the cowl closes against the forebody at the aft-most points of the inlet opening, low pressure boundary layer air, rather than free stream air, can be diverted out the side of the inlet. The inlet concept of the present invention can be utilized in any number of forebody/aperture integration schemes.

Figures 1A, 1B:
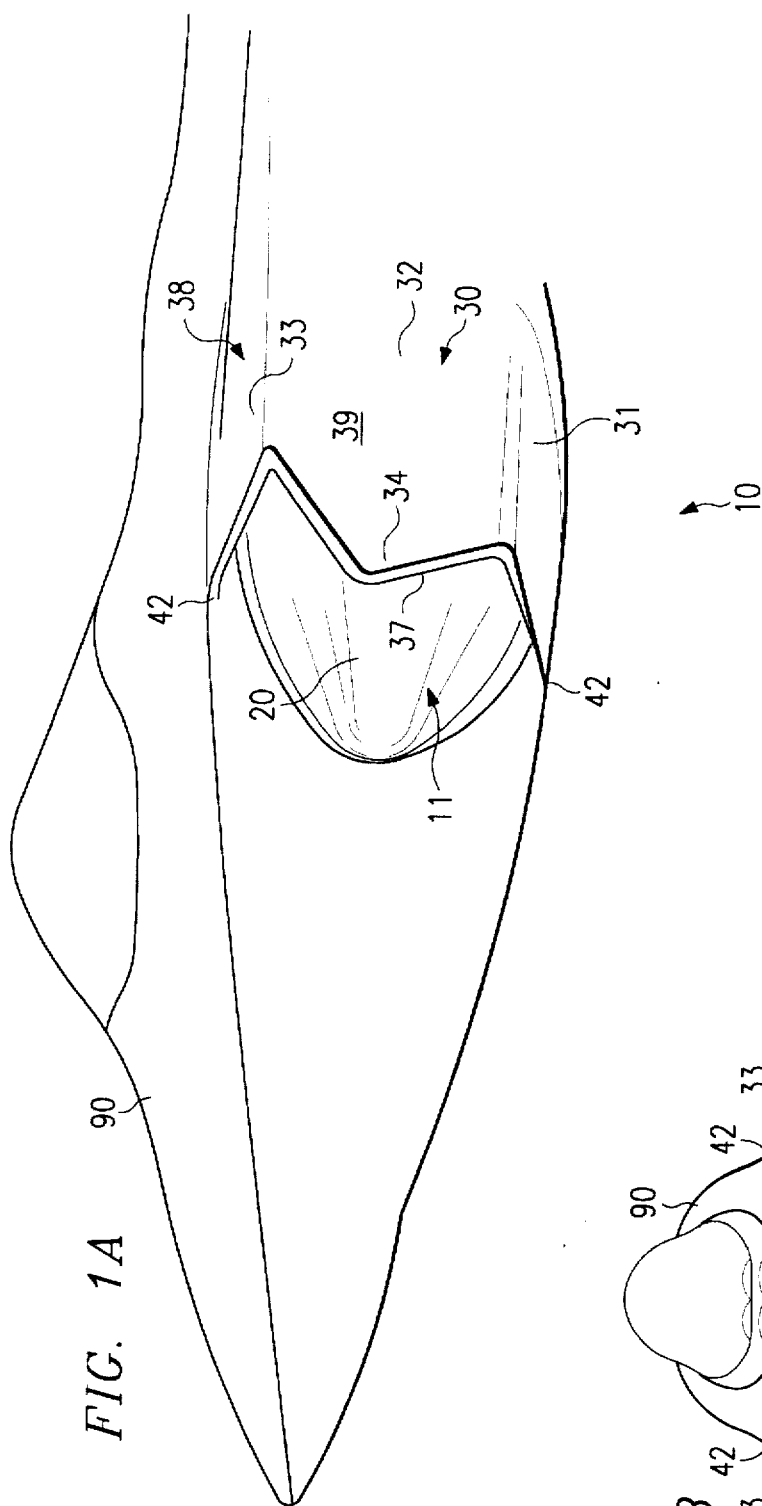
FIG. 1A shows one embodiment of the present invention side-mounted to the body of an aircraft.
FIG. 1B illustrates a front view of a side-mounted embodiment of the present invention.

FIG. 1A illustrates a side-mounted embodiment of the inlet 10 mounted to the body of an aircraft 90 with an opening 11 for receiving air into the inlet 10. The inlet 10 includes a bump 20 and a forward-swept, aft-closing cowl 30. The bump 20 is a raised surface formed outwardly from the aircraft towards the interior of the inlet 10. The bump 20 forms part of the inner surface of the inlet 10. The surface comprising the bump 20 begins to raise outwardly away from the body of the aircraft prior to the opening 11, so that boundary layer air will contact the bump 20 prior to arriving at the opening 11. The shape of the bump 20 can be varied depending on design parameters discussed more fully below.

Figure 1C:
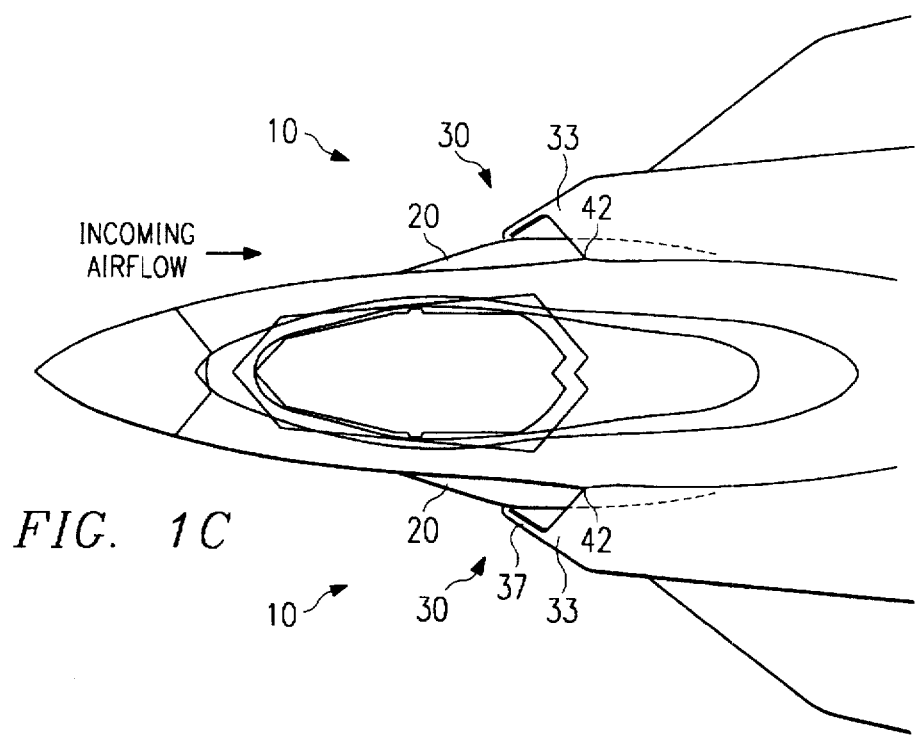
FIG. 1C illustrates a top view of a side-mounted embodiment of the present invention.

As shown in FIG. 1B, this side-mounted embodiment of the bump 20 extends outwardly from the body of the aircraft 90 with highest point of the bump 20 approximately at the center of the inlet and the bump gradually lessens in height as it approaches the cowl 30. FIG. 1C shows a side-mounted embodiment of the surface forming the bump 20 that gradually increase in height away from the body of the aircraft 90 near the opening 11, reaches a peak at a point inside the inlet 10, then gradually decreases in height near the rear of the inlet 10.

Figure 1D:
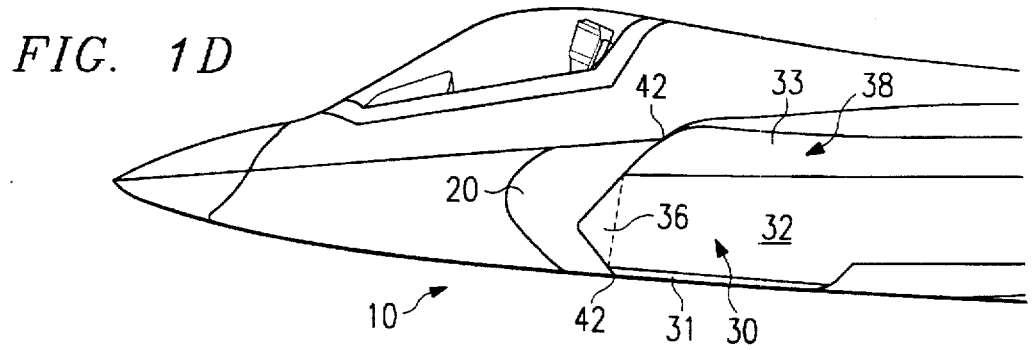
FIG. 1D illustrates a side view of a side-mounted embodiment of the present invention.

The cowl 30 includes an aft-closing portion 38 and a forward-swept portion 39 shown generally in FIG. 1A. The embodiment of the aft-closing portion 38 shown in FIGS. 1B, 1C, and 1D includes a pair of aft-closing panel sections 31 and 33 that close against the body of the aircraft at the aft-most points 42 of the cowl. The embodiment of the forward-swept portion 39 shown in FIGS. 1B, 1C, and 1D includes forward-swept panel section 32 that further includes tip 36. The forward-swept panel section 32 can include several sections joined together, or alternatively, can be a single piece. The embodiment of the cowl shown in FIG. 1A shows aft-closing panels 31 and 33 coupled to the body of the aircraft and extending outwardly from the aircraft. Aft-closing panels 31 and 33 include leading edge 37 that extends from the closure point 42 toward the front of the aircraft. Forward-swept panel section 32 joins aft-closing panel section 31 to aft-closing panel section 33 to form the cowl 30 that provides the outer frame of the inlet 10. Coupling the cowl 30 to the body of the aircraft forms the opening 11 of the inlet 10. The forward-swept panel section 32 of cowl 30 includes a triangular shaped tip 36 coming to a point at the forward-most point of the forward-swept panel section 32 to form the forward-swept portion 39 of the cowl. This side-mounted embodiment of the cowl 30 is also shown in FIGS. 1C and 1D. FIGS. 1C and 1D show the forward-swept portion 39 of the cowl 30 extending towards the front of the aircraft. FIG. 1D illustrates that the tip 36 of the forward-swept panel section 32 can be triangular in shape with an apex of the triangle approximately at the centerline of the inlet 10. As shown in FIG. 1C, the aft-closing panel sections 31 and 33 can close against the body of the aircraft at closure points 42. As illustrated in FIGS. 1C and 1D, cowl closure points 42 can be located at the aft-most points of the opening 11. As illustrated in FIG. 1B, forward-swept panel section 32 can join aft-closing panel sections 31 and 33 to create a cowl 30 that forms an inlet opening 11 with an approximately trapezoid shape as the cowl 30 closes against the body of the aircraft.

Figure 2A:
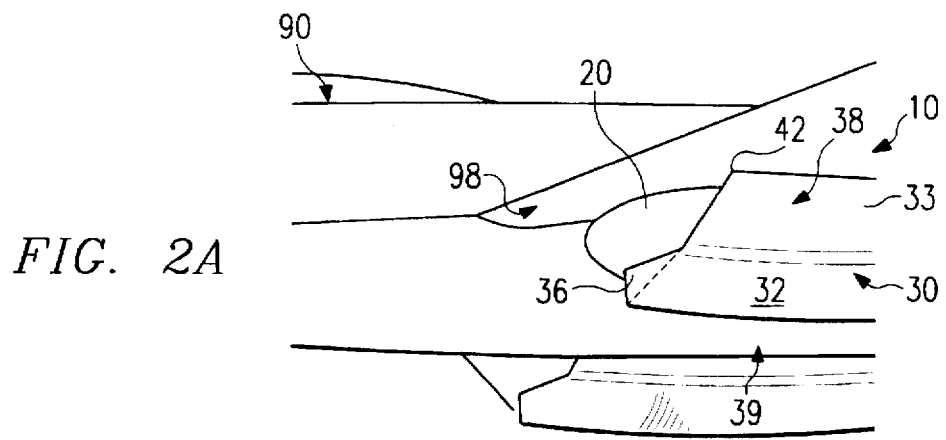
FIG. 2A shows another embodiment of the present invention mounted to the underside of a wing of an aircraft.
Figure 2B:
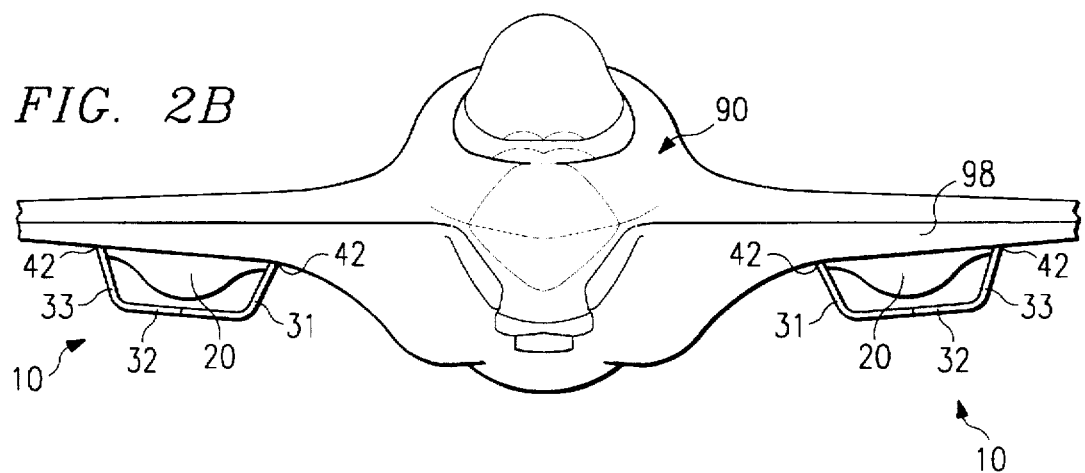
FIG. 2B illustrates a front view of a wing-mounted embodiment of the present invention.
Figure 2C:
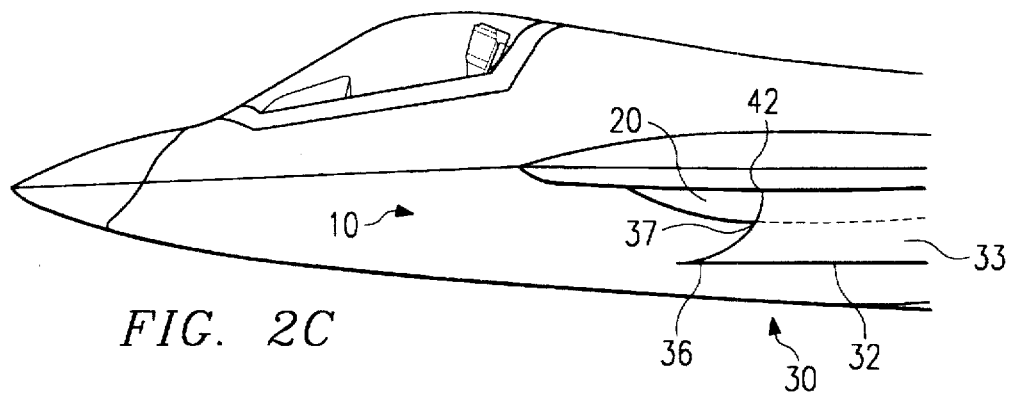
FIG. 2C illustrates a side view of a wing-mounted embodiment of the present invention.
Figure 2D:
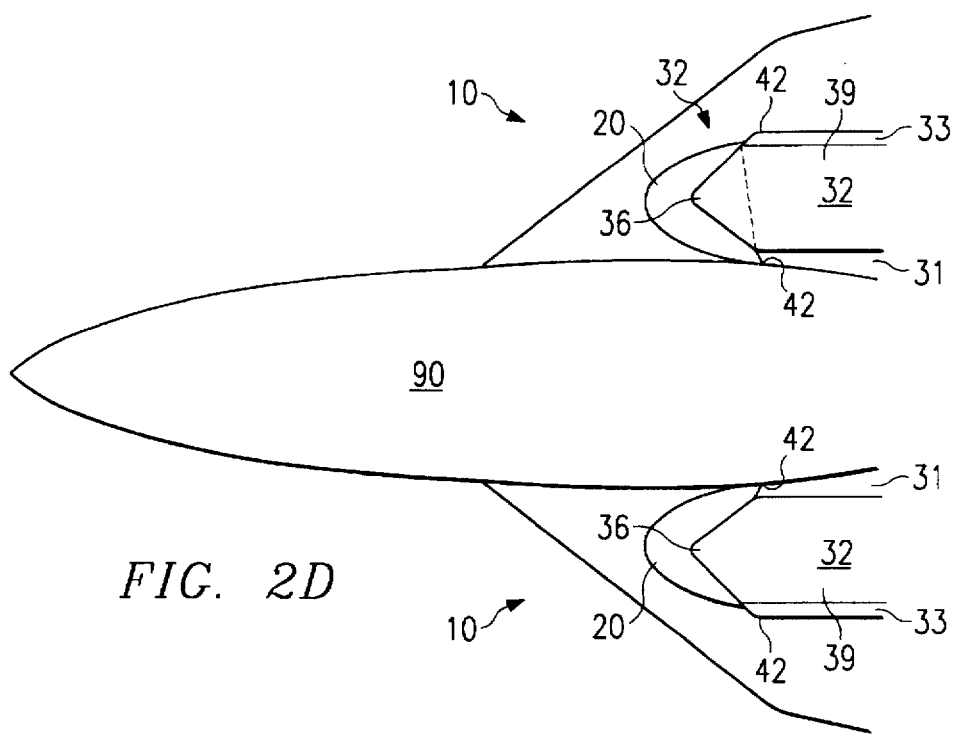
FIG. 2D illustrates a bottom view of a wing-mounted embodiment of the present invention.

FIG. 2A illustrates a wing-mounted embodiment of the inlet 10 with an opening 11 for receiving air into the inlet 10. In this alternative embodiment, the raised surface of the bump 20 is formed outwardly from the bottom of the wing 98 of the aircraft 90. As before, the inlet 10 includes a bump 20 and a cowl 30. FIG. 2E, 2C and 2D show the front, side and bottom views respectively of the side-mounted embodiment of FIG. 2B. FIGS. 2A–D again illustrate an embodiment of the inlet 10 with an approximately trapezoidal shaped opening 11, an aft-closing, forward-swept cowl 30 with an approximately triangular tip 36 at the forward most part of the forward-swept panel section 32, and a bump 20 raised outwardly in a generally curved manner with a peak approximately on the centerline of the inlet 10. FIGS. 1A–D and 2A–D are by way of illustration and not limitation. For example, the panel sections 31, 32, and 33 that form the outer portion of the cowl 34 could be formed from a single piece. Furthermore, panel sections 31, 32, and 33 could be formed such that, when coupled to the body of the aircraft, the shape of the opening 11 was approximately elliptical. For further example, the tip 36 could be formed with a curved outer portion rather than the shape of a triangle.

In operation, the bump 20 and cowl 30 work together to divert substantially all of the boundary layer air from the inlet 10. As the aircraft moves, the boundary layer air flows toward the inlet 10 while remaining approximately near the aircraft surface. Prior to reaching the inlet opening 11, the boundary layer air contacts the bump 20 which alters boundary layer air's path of motion to begin diverting this air away from the inlet opening 11. The shape of the cowl 30 helps to establish a pressure differential so that the pressure near the inlet opening 11 and inside the inlet 10 is higher than the pressure outside the opening 11. The shape of the cowl 30 creates a significantly lower pressure at the closure points 42. Thus, once the boundary layer air begins moving outboard due to the bump 20, the boundary layer air moves to the lower pressure regions near the closure points 42 and outside the inlet 10, rather than the higher pressure regions near the opening 11 of the inlet 10. This pressure gradient continues to divert boundary layer air during operation of the aircraft.

Figure 3:
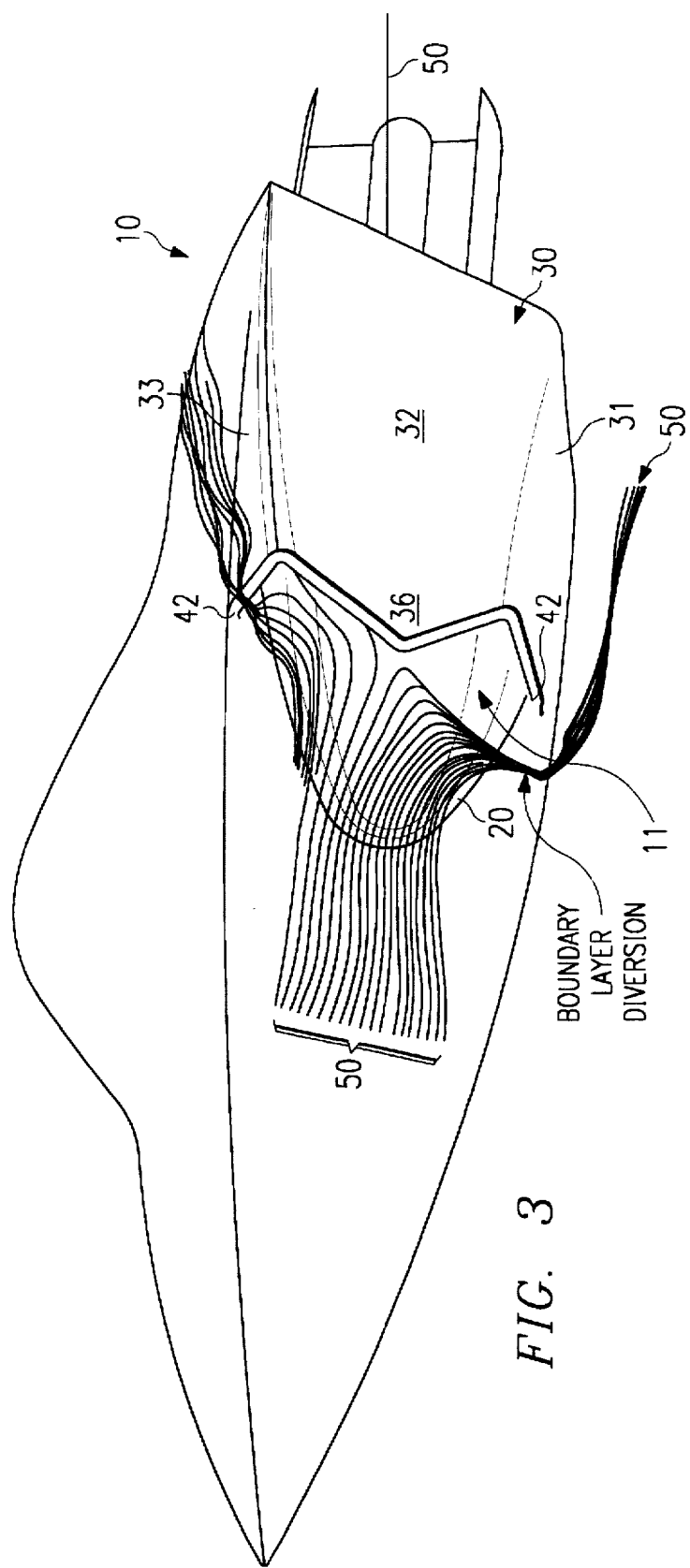
FIG. 3 illustrates the one solution describing the boundary layer diversion associated with one embodiment of the present invention at Mach 1.6.

Computer programs generate an image of an aircraft using computational fluid dynamics (CFD) analysis and aerodynamic simulation to model this inlet design. The computer program illustrates what the pressure field looks like around the inlet 10 and where the air flows in and around the inlet 10. FIG. 3 represents a solution of the present invention at Mach 1.6 for a side-mounted inlet 10. As indicated above, the interior of the inlet 10 and near the opening 11 are at a higher pressure region relative to the exterior of the cowl 30 and the closure points 42. The lines represent the paths 50 that particles or elements of boundary layer air travel. The paths 50 show how the bump 20 and cowl 30 work together to divert this boundary layer overboard. As the particles in the paths 50 approach the inlet 10, the bump 20 starts subtly moving the boundary layer air outboard. As shown by the paths 50, the boundary layer air particles then take a more extreme turn and go toward the outer edges of the cowl 30 due to the high pressure in the inlet 11 area that forces the boundary layer air to spill out to a lower pressure region. The higher pressure diverts the lower pressure, lower velocity boundary layer out around the cowl 30 and prevents substantially all of this lower energy boundary layer air from entering the inlet 10.

The inlet concept of the present invention will divert boundary layer air just by using the cowl 30 concept. However, the present invention without the bump 20 will only divert boundary layer to a certain Mach level. In order to divert substantially all of the boundary layer air at Mach 1.6 or higher, the present invention must utilize both the bump 20 and the cowl 30.

Figure 4A:
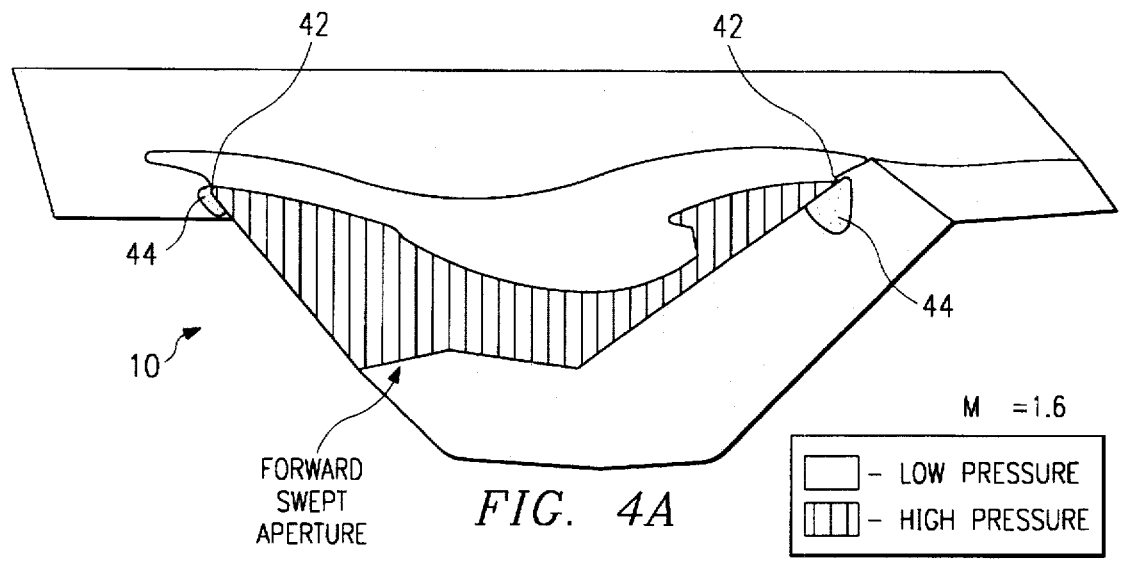
FIG. 4A illustrates an isometric view of the surface pressure coefficient of the same embodiment as shown in FIG. 4A of the present invention at Mach 1.6.
Figure 4B:
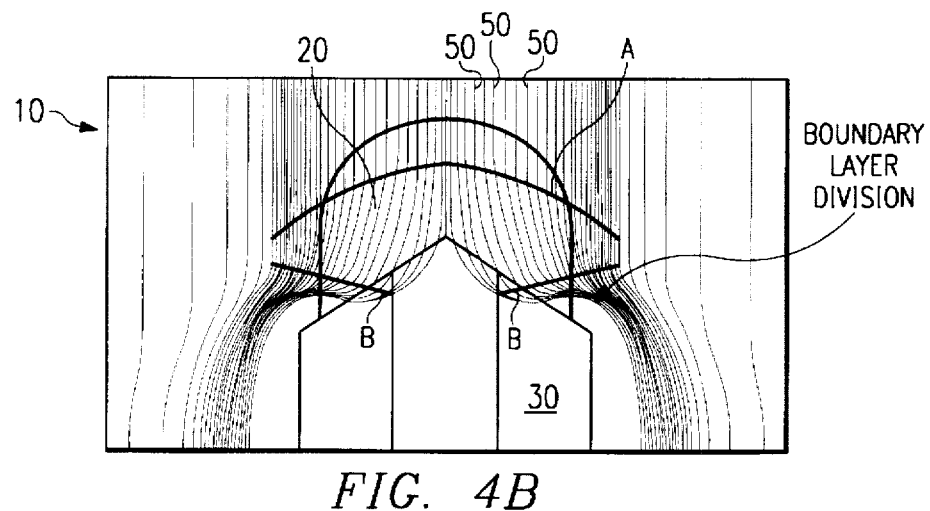
FIG. 4B illustrates a bottom view of the boundary layer diversion of the particle traces of another embodiment of the present invention at Mach 1.6.

FIG. 4A shows a CFD analysis on another embodiment of the present invention. In FIG. 4A, the surface pressure of the inlet 10 area is coded in terms of pressure contour where the dotted areas indicate lower pressure regions and cross-hatched areas represent regions of higher pressure. The areas marked 44 near the closure points 42 represent the lowest pressure region areas. FIG. 4A demonstrates that, in operation, the interior of the inlet 10 is at a higher pressure relative to the exterior of the cowl 30. FIG. 4B shows that as the particle trace paths 50 of the boundary layer air approach the bump 20, a subtle deflection of the particles outboard occurs as shown at point A. Due to the higher pressure region in the inlet 10, the boundary layer air particles then take a more extreme turn at point B and are diverted toward the outer edges and the closure points 42 of the cowl 30. As illustrated in FIG. 4B, the bump 20 causes the boundary layer air to start moving outboard and the higher pressure forces the boundary layer air to take a more extreme turn towards the outer edges of the cowl 30.

Figure 5:
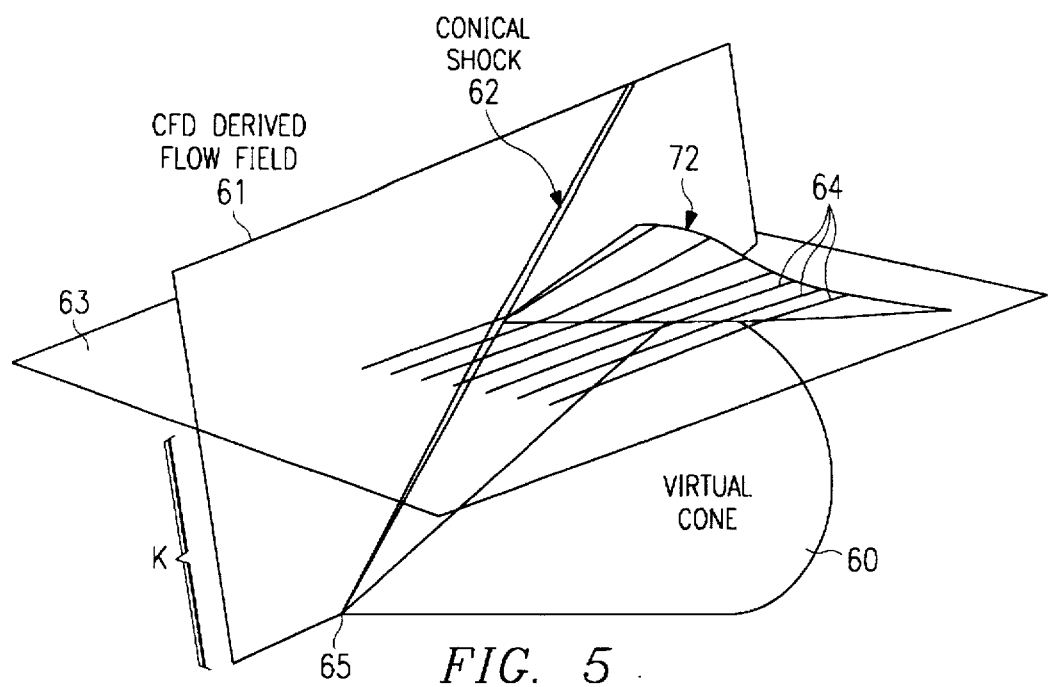
FIG. 5 illustrates one derivation of the compression surface from a conical flow field.
Figure 9A:
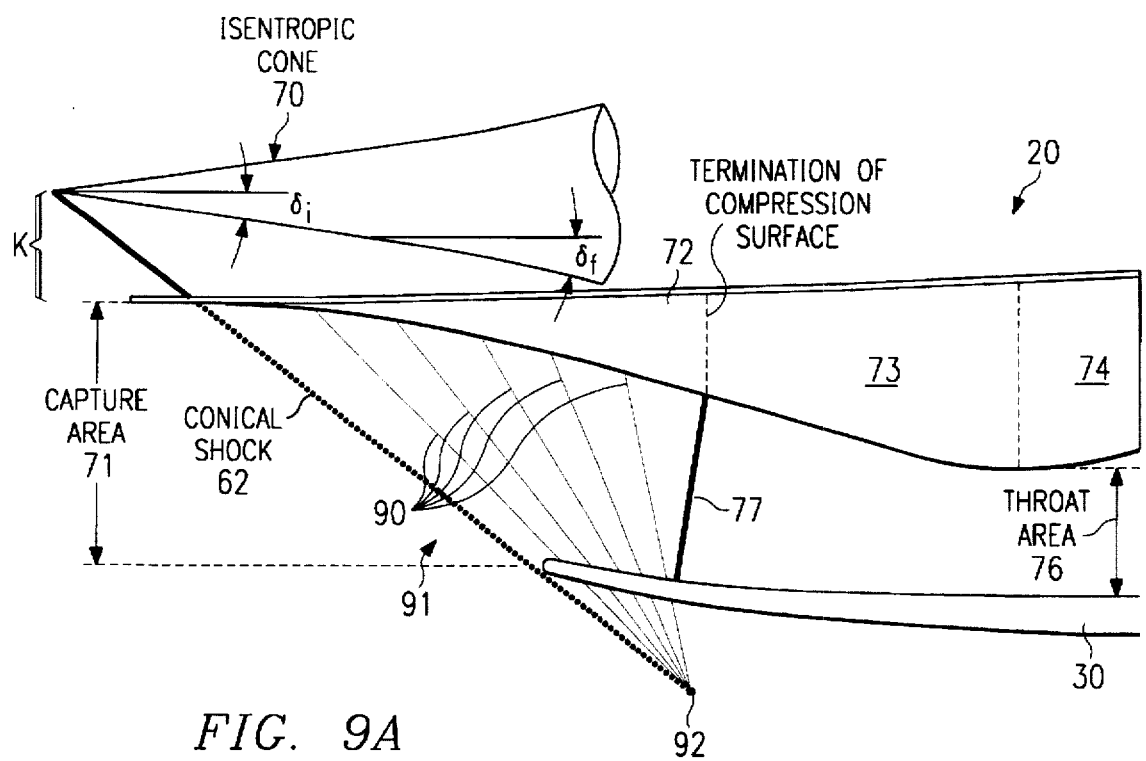
FIG. 9A shows another embodiment of the present invention utilizing an isentropic cone.
Figure 9B:
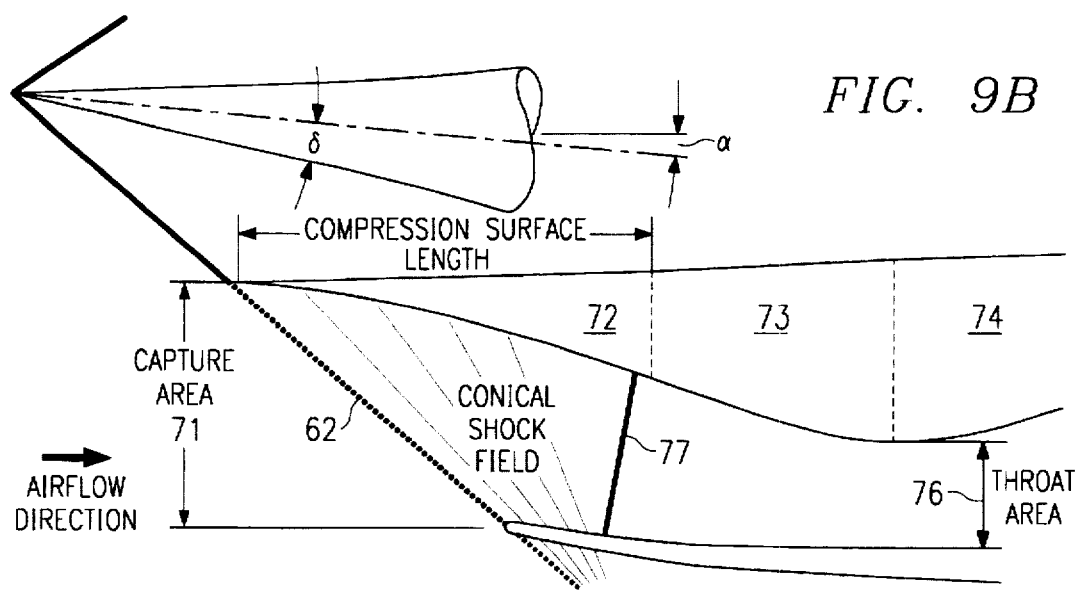
FIG. 9B shows another embodiment of the present invention utilizing an isentropic cone at an angle of attack.

As shown in FIG. 9A, the bump 20 comprises a compression surface 72, a transition shoulder 73, and a diffuser fairing 74. The shape of the compression surface 72 of the bump 20 can be determined by CFD computerized analysis. As illustrated in FIG. 5, in a computerized model, placing a virtual right circular cone 60 with a constant semi-vertex angle in a supersonic CFD derived flow field 61 will create a conical shock 62 field that is axisymmetric around the virtual cone 60 emanating from the apex 65 of the virtual cone 60. A plane of particles 63 is released and sent through the axisymmetric conical shock 62 at a distance above the apex of the cone known as k. The width of the cone formed by the conical shock 62 at the intersections of the conical shock cone with the plane of particles 63 is denoted as w. The ratio of k to w (k/w) is approximately 0.1 for the embodiment shown in FIG. 5. The particles 64 in the plane of particle released 63 propagate into the flow field and will alter course as the particles 64 pass through the conical shock 62. The shape formed above the original plane of release 63 after passing through the conical shock 62 defines the shape of a compression surface 72 that can be applied to the surface of the aircraft. If a compression surface 72 formed from this procedure is placed in the same flow field, the particles will flow as shown in FIG. 5. A computer program could store this compression surface 72 in its memory and apply the necessary contour of the compression surface 72 to the given shape of the aircraft. The computer must contain a definition of the flow field generated by the virtual cone and a definition of the particle release plane 63, then the computer program can generate the compression surface.

In an alternative embodiment, a parabolic shape, an elliptical shape, or a wedge could be used, rather than a right circular cone, to produce a flow field that could generate a compression surface 72.

Figure 6:
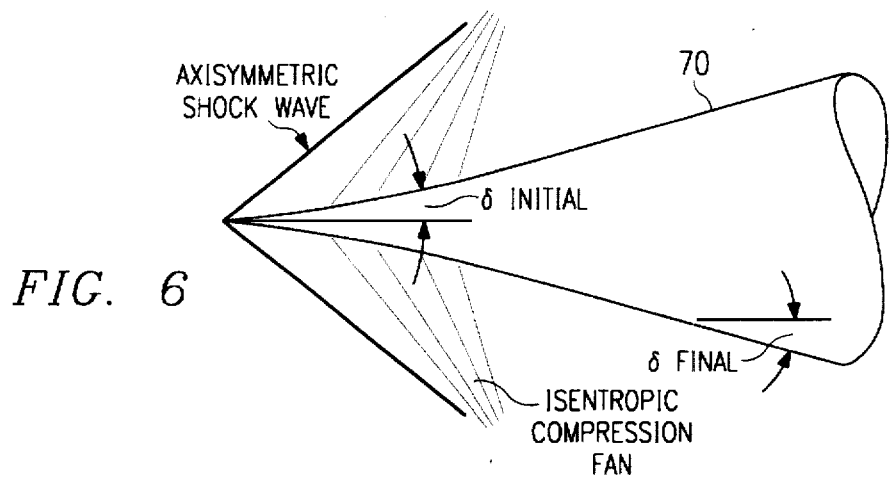
FIG. 6 illustrates an isentropic cone for deriving a compression surface.
Figure 7:
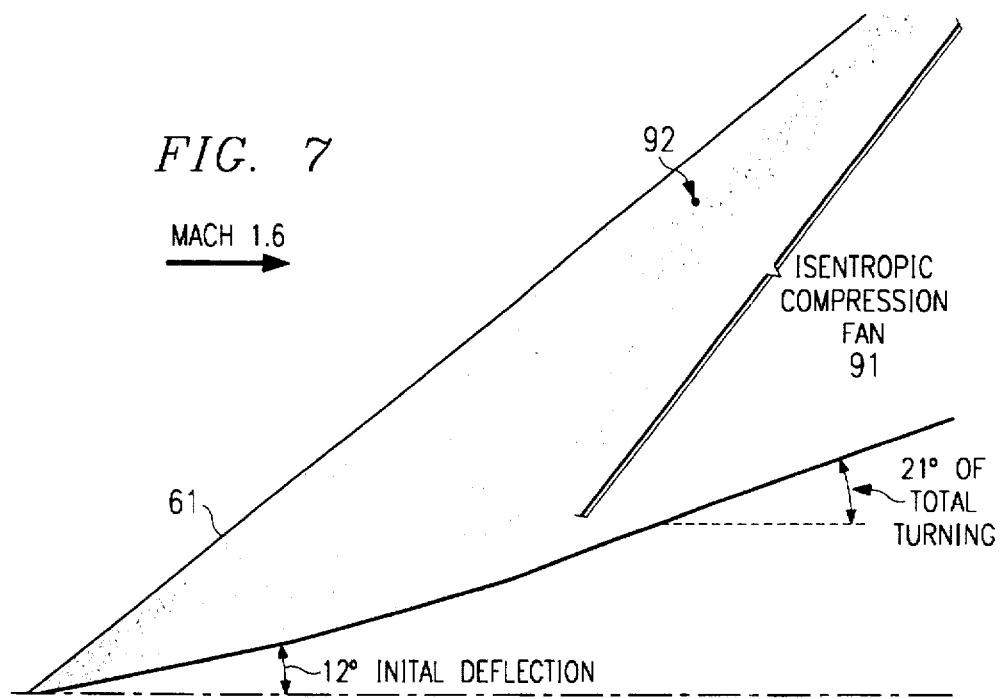
FIG. 7 illustrates one derivation of the isentropic compression surface at Mach 1.6.

FIG. 6 illustrates that an isentropic cone 70, rather than a right circular virtual cone 60 with a constant semi-vertex angle, can be used to create an isentropic compression surface 72. The isentropic cone 70 is used in the same manner described above to produce a flow field through which a plane of particles is released to determine the shape of the compression surface 72. The isentropic cone 70 has a cross section defined by an initial semi-vertex angle $\delta_i$ relative to the centerline of the isentropic cone 70 and a final vertex angle $\delta_f$ relative to the centerline of the isentropic cone 70. As shown in FIG. 6, the isentropic cone 70 has a smaller initial semi-vertex angle that gradually increases to a larger final vertex angle. The embodiment of FIG. 7 shows an the isentropic cone 70 with a lower semi-vertex angle defined by a deflection angle of 12° that gradually increases to reach a final vertex angle with a final deflection angle of 210°. These initial and final deflection angles are illustrative and can be modified to achieve a total turning angle of approximately 21 degrees.

Figure 8:
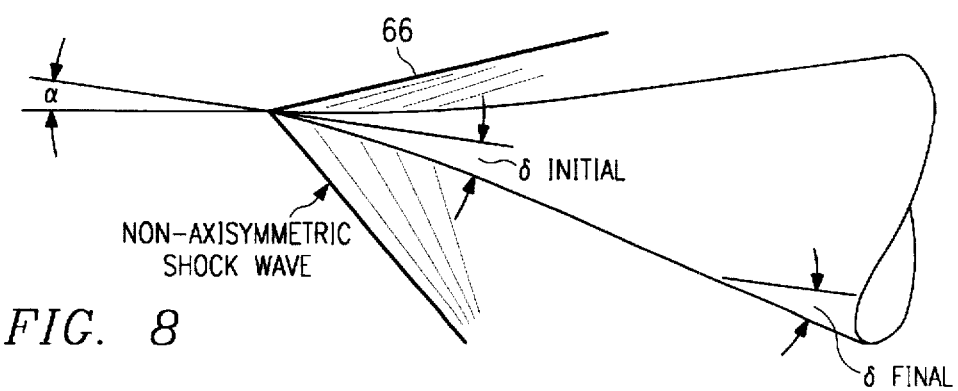
FIG. 8 illustrates an isentropic cone presented at an angle of attack to the air flow for deriving a compression surface.

FIG. 8 shows yet another embodiment of the virtual cone used to define the shape of the bump 20 where the isentropic cone 70 has been positioned relative to the release of particles 63 so that the centerline of the isentropic cone 70 is offset from the airflow release plane of particles 63 by an angle of attack α. Positioning a virtual cone at an angle of attack α relative to a computer generated supersonic CFD derived flow field 61 will create a non-axisymmetric (or distorted) conical shock 66 wave emanating from the apex of the virtual cone. Whereas an axisymmetric conical shock wave 62 has a circular cross section, the non-axisymmetric shock wave 66 will have an elliptical cross section. The angle of attack α illustrated in FIG. 8 is approximately 7 degrees, though the angle of attack α could be less than or greater than that illustrative value. The angle of attack a can be introduced for either a right circular or an isentropic cone 70. Positioning the cone at an angle of attack α with respect to the plane of particle release 63 results in a compression surface 72 with increased ability to diver boundary layer air as compared to a compression surface 72 formed from a cone not positioned at an angle of attack α with respect to the flow field.

FIG. 9A shows an isentropic cone 70 CFD solution for a compression surface 72. Through the procedures described above, the isentropic cone 70 will allow a CFD solution of the shape of an isentropic compression surface 72 of a different shape than the compression surface created by a circular cone of a constant semi-vertex angle. When the CFD derived flow field contacts the isentropic cone 70 shown in FIG. 9A, it produces a conical shock 62 and an infinite number of weak shocks 90 that form an isentropic compression fan 91. The isentropic compression fan 91 compresses to a focal point 92, after which the conical shock 62 returns to a single shock state.

An isentropic compression surface 72 provides technical advantages over a compression surface created from a constant vertex right circular cone. The isentropic compression surface 72 allows the utilization of a smaller inlet capture area to reduce weight and aid integration onto the aircraft. Furthermore, designing the isentropic compression surface 72 from an isentropic cone 70 that produces a focal point 92 outside the cowl 30 will allow for better performance because the air flows through a series of weak shock waves 90 rather than merely one strong conical shock wave and a terminal shock wave. A bump 20 with a compression surface 72 shaped based on an isentropic cone 70 with an initial deflection angle of 12° and a final deflection angle of 21°, for example, will produce an isentropic compression fan 91 with a focal point 92 outside the cowl 30.

FIG. 9B shows the integration of one embodiment of an isentropic bump 20 with the forward-swept aft-closing cowl 30 that includes an isentropic compression surface 72 created from an isentropic cone 70 positioned at an angle of attack α. The compression surface 72 in this embodiment has all of the advantages of a compression surface 72 formed without an angle of attack, with the additional advantage that the isentropic bump 20 of FIG. 9B can have an increased performance in diverting boundary layer air relative to an isentropic bump 20 with a compression surface 72 formed from an isentropic cone 70 without an angle of attack α.

FIG. 9B shows a cut-away side view of the bump 20 comprising a compression surface 72, a transition shoulder 73, and a diffuser fairing 74. The compression surface 72 terminates at the k/w point within the inlet. The transition shoulder 73 begins at the termination of the compression surface 72. In the embodiment described in FIG. 9B; the surface of the transition shoulder 73 initially has an angle in relation to the body of the aircraft approximately equal to the total turning angle of the compression surface 72. This angle gradually decreases until the angle of the surface of the transition shoulder 73 in relation to the body of the aircraft approaches approximately zero so the surface of the transition shoulder 73 is approximately parallel to the body of the aircraft, at which point the transition shoulder 73 terminates. The termination point of the transition shoulder 73 (when the angle of the surface of the transition shoulder 73 in relation to the aircraft body is approximately zero) defines the minimum throat area 76, or minimum flow area, of the inlet. A diffuser fairing 74 begins at the termination of the transition shoulder 73. The diffuser fairing 74 can gradually decrease in the height the surface of the bump 20 is raised away from the body of the aircraft body as the diffuser fairing 74 continues toward the aft of the inlet.

FIGS. 10A and 10B show graphical representations of the compression surface 72 and the transition shoulder 73. While both figures represent a compression surface derived as outlined above, FIG. 10 2 represents an embodiment of the transition shoulder 73 with improved boundary layer diversion.

The graphs in FIGS. 10A and 10B plot the surface slope in degrees on the y axis versus the bump station in inches (moving forward to aft) on the x axis. The different lines of plotted data on each graph indicate the surface slope versus the bump station at various radial locations on the surface of the bump 20. The inset indicates how to determine the radial location, described by the angle ϕ with relation to the bump centerline. For example, when the angle ϕ is zero degrees, this radial location represents approximately the plane of symmetry for the inlet (for example, the line represents the plot for a radial location described when ϕ is approximately zero degrees). The angle ϕ increases as the radial location on the surface of the bump 20 moves outboard. The solid vertical line in the graph represents the point where the compression surface terminates and the transition shoulder begins; thus, the portion of the graph to the left of the solid line represents the compression surface 72 and the portion to the right represents the transition shoulder 73.

The compression surface 72 geometry is identical on both FIGS. 10A and 10B and is defined by the CFD analysis described earlier. In both FIGS., the dashed line, shown in the legend representing a ϕ of approximately 0°, shows a surface slope of approximately 19.5° at the termination of the compression surface 72; the dash, two dot, dash line, representing a ϕ of approximately 40°, shows a surface slope of approximately 14° at the termination of the compression surface 72. These FIGUREs illustrate that as the radial location moves outboard, the peak angle at that bump station declines. In FIG. 10A, the slope of the surface reaches a maximum for each radial location of the bump at the point where the compression surface terminates and the transition shoulder begins, or at approximately forty-one inches for the embodiment of FIG. 10A. The reduction in slope from the beginning of the transition shoulder at approximately forty-one inches to the end of the transition shoulder at approximately sixty-seven inches is constant. Each of the curves is a straight line, representing a pure radius of curvature having a constant turn rate, from the maximum surface slope at the termination of the compression surface 72 to a zero surface slope at the termination of the transition shoulder 73. Thus, for the transition shoulder described in FIG. 10A, the change in degrees per inch is approximately a constant for each radial location. In FIG. 10B, represents a different shape of the transition shoulder 74. In FIG. 10B, the slope of the surface reaches a maximum at a different bump station location for each different radial location. For example, while the dashed line for a φ of approximately 0° still shows a peak surface slope (of approximately 19.5°) at the termination of the compression surface 72, the dash-two dot-dash line for φ of approximately 40° shows a peak surface slope of approximately 19.5° at a bump station well into the transition shoulder 73 portion of the bump 20 (at approximately 50 inches) Thus, rather than having reduction in surface slope for all radial locations beginning at the termination of the compression surface, the peak surface slope occurs increasing further into the transition shoulder 73 until a radial location of approximately 60°. Rather than a straight line from the point where each radial cut intersects the termination of the compression surface to the termination of the transition shoulder (as in FIG. 10A), a significant number of the radial cut plots rise to a nearly equivalent peak surface slope before falling back to zero. For example, the dash-two dot-dash line for the radial location of approximately 40° intersects the vertical separation line in FIG. 10B at approximately 14°. However, instead of dropping immediately down to 0°, the dash-two dot-dash line increases again from 14° to approximately 19°, where it then drops down to 0° at a bump station of approximately sixty-six inches. These FIGUREs illustrate that while the slope of the dashed line for φ of approximately 0° in FIG. 10A has the highest slope, the slope of the dashed line for φ of approximately 0° in FIG. 10B has a lower slope than a significant number of the other plotted lines. Controlling the slopes of the lines after the termination of the compression surface 72 determines the shape of the transition shoulder 73.

Figure 10A:
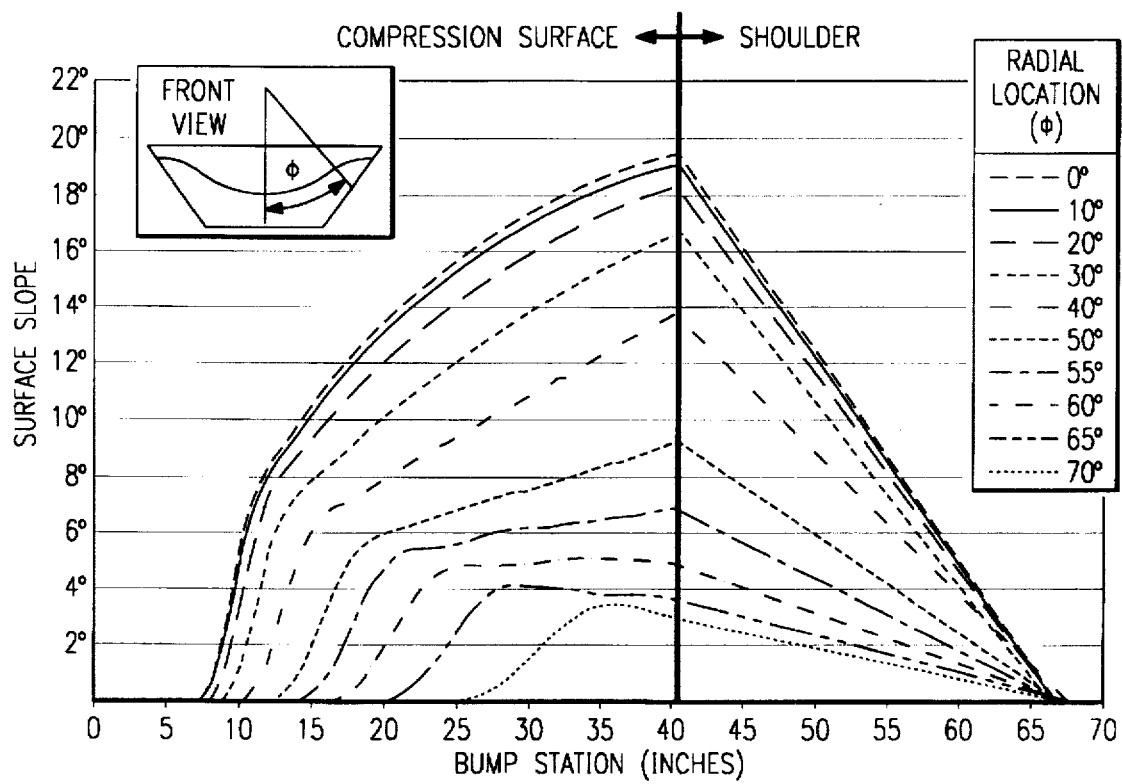
FIG. 10A is a graphical representation of the surface slope of the compression surface and the transition shoulder.
Figure 10B:
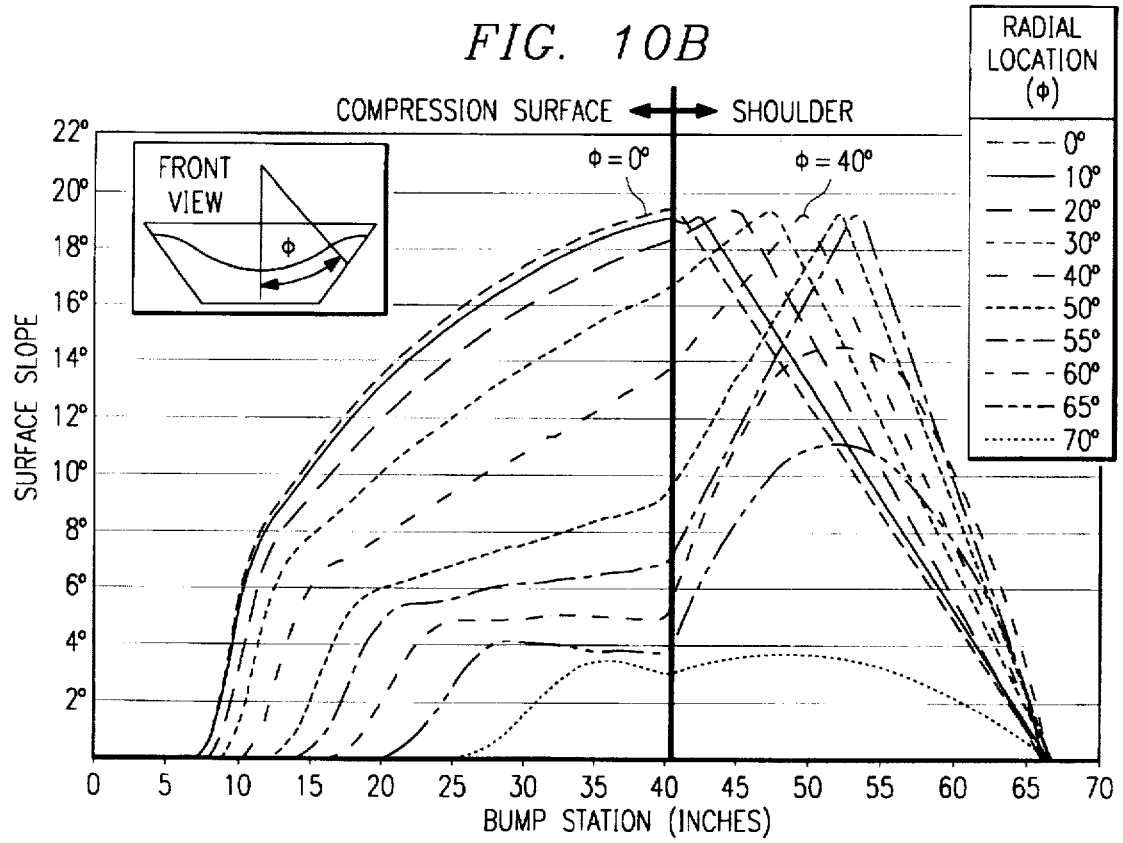
FIG. 10B is a graphical representation of another embodiment of the compression surface and transition shoulder.

In operation, the embodiment of the transition shoulder 73 in FIG. 10B provides a technical advantage over the embodiment of the transition shoulder 73 of FIG. 10A by increasing the amount of boundary layer air that will be diverted outboard. The amount of boundary layer air diverted outboard increases because this embodiment of the transition shoulder 73 of FIG. 10B creates a greater spanwise static pressure gradient than the transition shoulder 73 embodiment of FIG. 10A.

Figure 11:
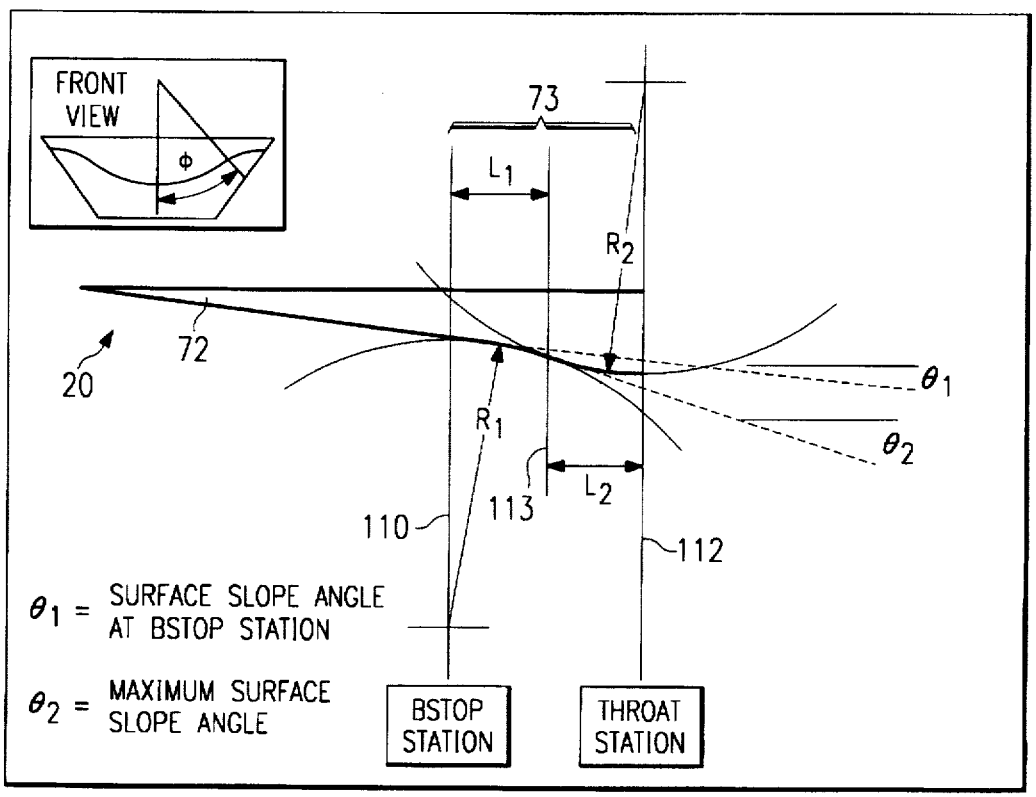
FIG. 11 illustrates the shape of one embodiment of the transition shoulder of the present invention.

FIG. 11 shows the design parameters for determining a transition shoulder with a varying rate of surface slope change relative to radial location. As shown in the front view legend in FIG. 11, the radial location on the surface of the transition shoulder is zero degrees along the centerline of the transition shoulder. The radial location value in degrees increases as radial location moves outwardly away from the centerline of the transition shoulder.

FIG. 11 the bump 20 has a transition shoulder 73 beginning at the Bstop station 110 and terminating at the throat station 111. The surface 112 of the transition shoulder 73 shown in FIG. 11 consists of two surface portions along surface 112, the first defined by the length $L_1$ from the Bstop station 110 to the intersection of the transition shoulder 113, and the second defined by $L_2$ from the intersection 113 to the throat station 112. The shape of the surface portion 111 of the transition shoulder 73 is defined by the radius $R_1$ for the length $L_1$ and by the radius $R_2$ over the length $L_2$, where the radii $R_1$ and $R_2$ are defined by the following formulas:

$$R_1 = \frac{L_1/2}{\sin\left(\frac{\theta_2 - \theta_1}{2}\right) \cos\left(\frac{\theta_2 + \theta_1}{2}\right)}$$

$$R_2 = L_2/\sin(\theta_2)$$

where $\theta_1$=Surface Slope Angle at Bstop Station
$\theta_2$=Maximum Surface Slope Angle $L_1 + L_2 =$ F. S.$)_{Throat}$ − F. S.$)_{Bstop}$ $0 \leq L_2 \leq$ F. S.$)_{Throat}$ − F. S.$)_{Bstop}$ $L_2 = \theta_2/1.5 @ \phi = 55°$ As shown in FIG. 11, the shape of the first surface portion is concave and is formed according to the arc defined by $R_1$ rotated about a point on the Bstop station away from the body of the aircraft. The shape of the second surface portion is convex and is formed according to the arc defined by $R_2$ rotated about a point on the throat station toward the body of the aircraft.

In the above equations, F. S.$)_{Throat}$ and F. S.$)_{Bstop}$ represent fuselage stations on the surface of the aircraft. For a typical aircraft application, bump station of zero inches can correspond to a fuselage station of approximately 262.3 inches. F. S.$)_{BSTOP}$ represents the point at which the compression surface 72 ends and transition shoulder 73 begins. F. S.$)_{Throat}$ represents the point at which the transition shoulder 73 terminates. The throat station point is a function of the length of the aircraft and the Bstop station is a user defined point. $L_1 + L_2$ is a constant distance defined by the difference between F. S.$)_{Throat}$ and F. S.$)_{BSTOP}$. While $L_1 + L_2$ is always constant, each surface portion length varies depending on radial location. For example, $L_1$ at $\phi=40$ degrees can be longer than $L_1$ at $\phi=0$ degrees.

The maximum surface slope angle ($\theta_2$) is a constant (for the embodiment illustrated in FIG. 10B, $\theta_2$ equals approximately 19.5°) that is defined at the Bstop station for a radial location of zero degrees. While other radial locations may have different bump stations at which the maximum surface slope angle occurs, the surface slope angle will never exceed the surface slope angle at the Bstop station for a radial location of zero degrees.

The surface slope angle at Bstop Station ($\theta_1$) is a known value that changes based on the radial location. In FIG. 10B, a radial location of 0° the surface slope angle is approximately 19.5°; for a radial location of 10° the surface slope angle is approximately 18°; and so forth.

At the Bstop station, $L_2$ is defined to be zero. $L_2$ is then determined for a radial location φ of 55° according to the above equation ($L_2 = \phi_2/1.5 @ \phi = 55°$) The 1.5 factor was determined through analysis as a constant whose use would result in an improved transition shoulder. Other factors could possibly be used in this equation. By assuming a linear regression between the points defining $L_2 @ \phi=0°$ and $L_2 @ \phi=55°$ with a straight line, $L_2$ can be determined for radial locations between zero and fifty-five degrees. For the embodiment of FIGS. 10B and 11, $L_2$ values were determined for radial locations of 10, 20, 30, 40, and 50 degrees. While the embodiment described by FIGS. 10B and 11 use a straight line regression to determine $L_2$ for radial locations up to 55°, other regression analyses could also be used to determine $L_2$. For radial locations exceeding 55°, the user defines $L_2$. FIG. 10B shows one example of how to define 81 and $74_2$ at radial locations in excess of 55°. The values of $L_1$ at equivalent radial locations can then be determined from the $L_2$ values (by subtracting $L_2$ from the total distance from Bstop to throat station). Once $\theta_2$, $\theta_1$, $L_1$ and $L_2$ have been determined for each radial location $\phi$, $R_1$ and $R_2$ can be calculated for each radial location $\phi$ using the equations for $R_1$ and $R_2$ stated earlier.

Figure 12:
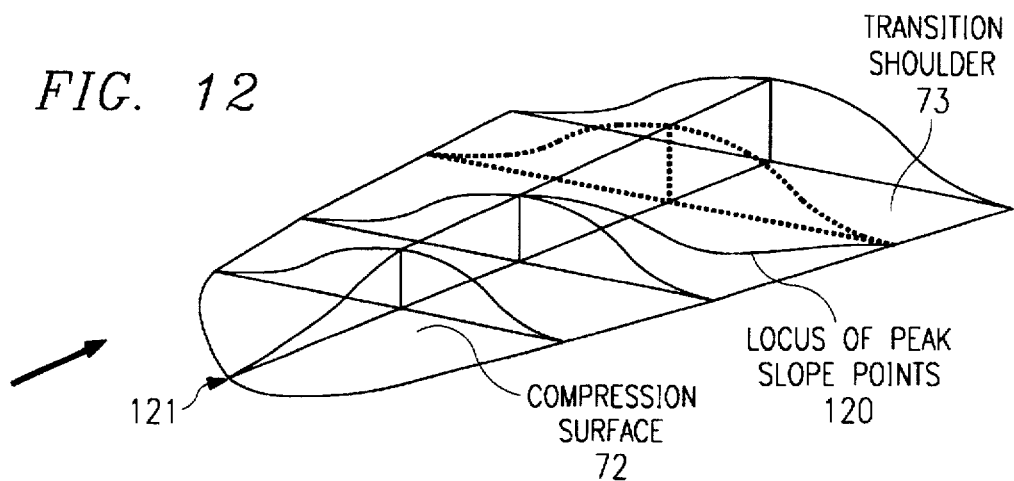
FIG. 12 shows one embodiment of the compression surface and transition shoulder of the present invention.

As shown in FIG. 11, the slope of the surface of the transition shoulder 73 will increase from the Bstop station 110 over the length $L_1$ to a maximum slope at the intersection 113, and will then decrease over the length $L_2$ to a slope of zero at the throat station 112. Thus, the graphical representation of the transition shoulder surface slope of FIG. 10B shows that the intersection 113 for the transition shoulder represented in FIG. 10B occurs at a bump station of approximately 50 inches for a radial location of 40 degrees. As FIG. 10B illustrates, the maximum surface slope of the transition shoulder 73 will occur at different bump stations for different radial locations $\phi$ FIG. 12 shows an isometric view of the compression surface 72 and transition shoulder 73 graphically represented in FIG. 10B. As shown in FIG. 12, the maximum or peak surface slope occurs at varying distances aft of the initiation of the compression surface 120. This varying aft distance is illustrated by the line depicting the locus of peak surface slope 120. This also indicates that $L_1$ and $L_2$ will vary as the radial location $\phi$ varies.

Figure 13A:
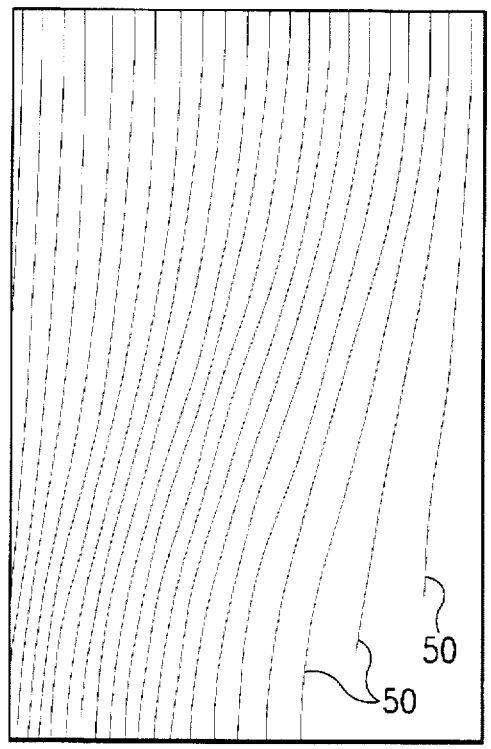
FIG. 13 illustrates graphically the diversion of boundary layer air outboard by two embodiments of the present invention
Figure 13B:
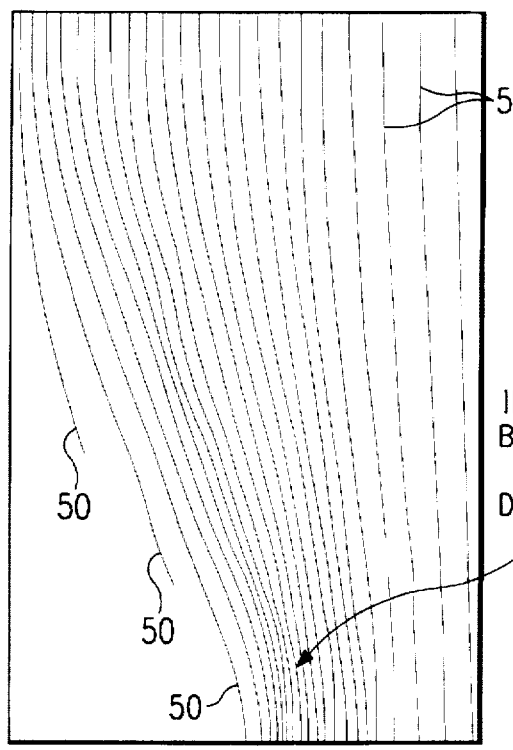

FIG. 13 illustrates improved boundary layer diversion of the present invention using a compression surface designed from an isentropic cone with a seven degree angle of attack and a transition shoulder with a varying rate of decrease in surface slope (illustrated as Design B) as compared to the boundary layer diversion of an embodiment of the present invention using a compression surface designed with no angle of attack and with a transition shoulder with a constant rate of change in surface slope (illustrated as Design A). Design B of FIG. 13 shows the particle trace paths 50 of the boundary layer air pushed further outboard as compared to the particle trace paths 50 of the boundary layer air associated with the embodiment of Design A. The CFD analysis performed on these two embodiments indicate approximately 1% improvement in total performance for Design B over Design A.

In summary, the present invention provides a diverterless engine inlet system that utilizes a bump with an isentropic compression surface, a transition shoulder and a diffuser fairing in combination with an aft-closing forward-swept cowl to divert boundary layer air from an aircraft engine inlet. The present invention eliminates the need for a boundary layer diverter, an overboard bypass system, and a boundary layer bleed system currently used on conventional air induction systems for supersonic aircraft. The present invention reduces aircraft weight, cost, and complexity. These features are eliminated because the compression surface and cowl work synergistically to provide a passive boundary layer diversion capability.

Although the present invention has been described in detail, it should be understood that various changes, substitutions and alterations can be made hereto without departing from the spirit and scope of the invention as described by the appended claims.

What is claimed is:

1. A system for diverting boundary layer air from an aircraft engine inlet, comprising:
 a surface raised outwardly from the body of the aircraft, said surface comprising;
 a compression surface near the opening of said inlet;
 a diffuser fairing; and
 a transition shoulder beginning at the Bstop station and ending at the throat station, said transition shoulder having a varying rate of change of surface slope relative to radial location on the surface of said transition shoulder, said transition shoulder operable to create a greater spanwise static pressure gradient to increase the amount of boundary layer air diverted from the aircraft inlet.

2. The system of claim 1 wherein the radial location on the surface of said transition shoulder is zero degrees along the centerline of the transition shoulder and increases as the radial location moves outwardly away from the centerline of the transition shoulder.

3. The system of claim 2 wherein the transition shoulder surface further comprises a first surface portion of length $L_1$ and a second surface portion of length $L_2$, said first surface portion defined by an arc according to a first radius $R_1$ and said second surface portion defined by an arc according to a second radius $R_2$.

4. The system of claim 3 wherein said arc according to $R_1$ is defined by $R_1$ centered on the Bstop station and rotated to form a concave first surface portion, and further wherein said arc according to $R_2$ is defined by $R_2$ centered on the throat station rotated to form a convex second surface portion.

5. The system of claim 4 wherein the first surface portion has a varying length $L_1$ depending on radial location and the second surface portion has a varying length $L_2$ depending on radial location, and further wherein the sum in length of $L_1$ and $L_2$ equals the distance between the Bstop station and the throat station.

6. The system of claim 5 wherein the maximum surface slope angle $\theta_2$ at any point along the surface of the transition shoulder is a constant and is determined at the Bstop location for a radial location of zero degrees.

7. The system of claim 6 wherein the Bstop station surface slope angle $\theta_1$ is a maximum at a radial location of zero degrees and gradually decreases for increasing radial locations.

8. The system of claim 7 where first radius $R_1$, second radius $R_2$ are defined by the formulas:

$$R_1 = \frac{L_1/2}{\sin\left(\frac{\theta_2 - \theta_1}{2}\right)\cos\left(\frac{\theta_2 + \theta_1}{2}\right)}$$

$$R_2 = L_2/\sin(\theta_2)$$

9. The system of claim 8 wherein for a radial location of zero degrees $L_2 = 0$.

10. The system of claim 9 wherein for a radial location of 55 degrees, the second length $L_2$ is defined by the following equation:

$$L_2 = \theta_2/1.5 \; @ \phi = 55°$$

11. The system of claim 10 wherein the second length $L_2$ for any other radial location is determined through a linear regression analysis between $L_2$ at zero degrees and $L_2$ at fifty five degrees.

12. The system of claim 10 wherein the second length $L_2$ is defined by the following equation:

$$L_2 = \theta_2/X \; @ \phi = 55°$$

where X is a numeric value greater than 1.5.

13. The system of claim 10 wherein the second length $L_2$ is defined by the following equation:

$$L_2 = \theta_2/X \; @ \phi = 55°$$

where X is a numeric value less than 1.5.

14. A method for diverting boundary layer air from an inlet comprising;
- forming a compression surface raised outwardly from the body of the aircraft in the boundary layer air path to initially alter the flow of the boundary layer air;
- forming a transition shoulder beginning at the Bstop station, delineating the termination of the formed compression surface, and ending at the throat station, said transition shoulder having a surface wherein the radial location on the surface of said transition shoulder is zero degrees along the centerline of the transition shoulder and increases as the radial location moves outwardly away from the centerline of the transition shoulder;
- varying the rate of change of surface slope relative to radial location on the transition shoulder surface, thereby increasing the spanwise static pressure gradient to further divert boundary layer air; and
- diverting substantially all of said boundary layer air to prevent said boundary layer from entering said inlet.

15. The method of claim 14 wherein forming a transition shoulder further comprises forming the transition shoulder surface with a first surface portion of length $L_1$ and a second surface portion of length $L_2$.

16. The method of claim 15 further comprising defining the shape of said first surface portion by an arc according to a first radius $R_1$ and defining the shape of said second surface portion by an arc according to a second radius $R_2$.

17. The method of claim 16 wherein said defining the shape of said first surface portion further comprises centering $R_1$ on the Bstop station and rotating $R_1$ to form a concave first surface portion, and wherein defining the shape of said second surface portion further comprises centering $R_2$ on the throat station and rotating $R_2$ to form a convex second surface portion.

18. The method of claim 17 further comprising;
- varying the length $L_1$ of the first surface portion according to radial location;
- varying the length $L_2$ of the second surface portion according to radial location; and
- maintaining the sum in length of $L_1$ and $L_2$ at any radial location equal to the distance between the Bstop station and the throat station.

19. The method of claim 18 further comprising determining a maximum surface slope angle $\theta_2$ at the Bstop station for a radial location of zero degrees, and maintaining that maximum surface slope angle at any point along the surface of the transition shoulder.

20. The method of claim 19 further comprising forcing the maximum surface slope angle $\theta_1$ at the Bstop station to occur at a radial location of zero degrees, and gradually reducing the surface slope angle at the Bstop station for increasing radial locations.

21. The method of claim 20 further comprising defining first radius $R_1$ and second radius $R_2$ by the formulas:

$$R_1 = \frac{L_1/2}{\operatorname{Sin}\left(\frac{\theta_2 - \theta_1}{2}\right) \operatorname{Cos}\left(\frac{\theta_2 + \theta_1}{2}\right)}$$

$$R_2 = L_2/\operatorname{Sin}(\theta_2)$$

22. The method of claim 21 further comprising setting the value of $L_2 = 0$ at a radial location of zero degrees.

23. The method of claim 22 further comprising defining the value of the second length $L_2$ for a radial location of fifty-five degrees by the following equation:

$$L_2 = \theta_2/1.5 \ @\phi=55°$$

24. The method of claim 23 further comprising determining the value of second length $L_2$ for any radial location other than zero and fifty-five degrees by performing a linear regression analysis between $L_2$ at zero degrees and $L_2$ at fifty five degrees.

25. The method of claim 24 further comprising defining the value of the second length $L_2$ at a radial location of fifty-five degrees by the following equation.

$$L_2 = \theta_2/X \ @\phi=55°$$

where X is a numeric value greater than 1.5.

26. The method of claim 24 further comprising defining the value f the second length $L_2$ at a radial location of fifty-five degrees by the following equation:

$$L_2 = \theta_2/X \ @\phi=55°$$

where X is a numeric value less than 1.5.

27. A method for determining the shape of a varying slope transition shoulder to use in a system for diverting boundary layer air from an inlet comprising the steps of:
- determining the length of a transition shoulder beginning at a Bstop station and terminating at a throat station, said transition shoulder surface length comprising the sum of the first surface portion length $L_1$ and a second surface portion length $L_2$;
- defining the maximum surface slope $\theta_2$ as the surface slope at the Bstop station for a radial location of zero degrees;
- defining $L_2$ equal to zero for a transition shoulder surface radial location of zero degrees;
- defining $L_2$ equal to $\theta_2/X$ for a transition shoulder surface radial location of fifty-five degrees, where x is a constant value between 1 and 10;
- performing a regression analysis to determine the value of $L_2$ for a plurality of radial locations between zero and fifty-five degrees;
- determining the values of $L_1$ at the plurality of radial locations between zero and fifty-five degrees from the corresponding values of $L_2$;
- determining a first radius $R_1$ and second radius $R_2$ by the formulas:

$$R_1 = \frac{L_1/2}{\operatorname{Sin}\left(\frac{\theta_2 - \theta_1}{2}\right) \operatorname{Cos}\left(\frac{\theta_2 + \theta_1}{2}\right)}$$

$$R_2 = L_2/\operatorname{Sin}(\theta_2)$$

- defining the transition shoulder first surface portion of length $L_1$ to have a concave contour according to said first radius $R_1$; and
- defining the shape of transition shoulder second surface portion of length $L_2$ to have a convex contour according to said second radius $R_2$.

28. The method of claim 27 further comprising applying the transition shoulder to a surface of an aircraft as part of a boundary layer diversion system.

* * * * *